April 6, 1926.  1,579,456
A. P. SCHAT
DAVIT
Filed Feb. 18, 1922
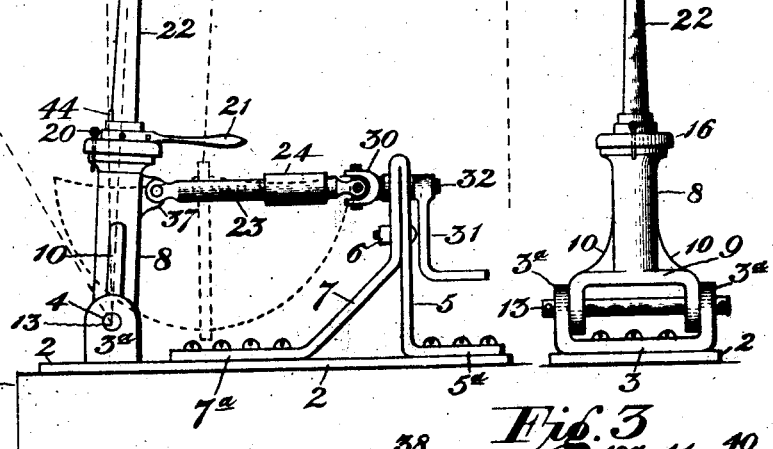
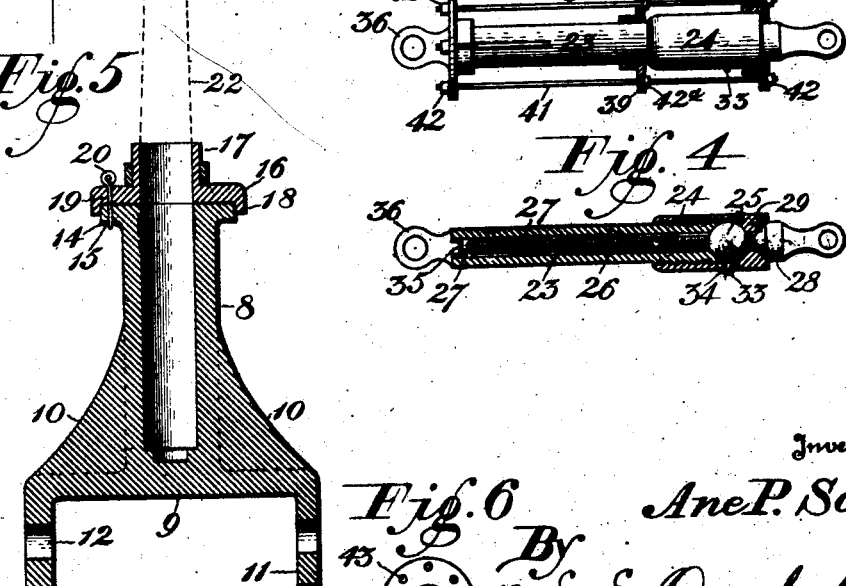
Inventor
Ane P. Schat
By E. E. Overholt
Attorney Patented Apr. 6, 1926.

1,579,456

UNITED STATES PATENT OFFICE.

ANE PIETER SCHAT, OF THE HAGUE, NETHERLANDS.

DAVIT.

Application filed February 18, 1922. Serial No. 537,653.

*To all whom it may concern:*

Be it known that I, ANE P. SCHAT, a citizen of the Netherlands, residing at The Hague, in the Province of Zuid, and Kingdom of the Netherlands, have invented certain new and useful Improvements in Davits, of which the following is a specification.

My invention relates to davits for raising and lowering lifeboats, particularly boats for harbor use, which have to be swung in and out so frequently that it is very desirable to have the davits provided with means for easily and quickly returning the boats inboard without the necessity of having to rig up tackle for that purpose.

My object is to provide a davit of this character adapted to be swung in and out by means of a thrust screw housed in a protecting tube, with the parts so arranged that slight springing or bending of the tube, from accident or otherwise, will not affect the operation of the screw.

Another object is to provide means for shielding the protecting tube against blows or sudden strains of any kind that might permanently spring or bend it to a degree that would hinder the operation of the screw or possibly render it inoperative.

A further object is to provide a device of the character described, with the parts so constructed and arranged that the jib of the davit can be given ample overhang without imparting torsional strain to the thrust screw mechanism when the davit is heavily loaded.

A still further object is to provide a davit which may be made either automatic or non-automatic, at the will of the operator, in so far as its inboard and outboard movement is concerned.

Other objects will appear in the subjoined description.

An important feature of the invention consists in the thrust screw arrangement which not only has the usual universal joint at one end thereof, but is also provided with a universal joint inside the telescoping parts to prevent accidental springing or bending of the outer tube from unfavorably affecting the easy and perfect operation of the screw; while another feature is the light and simple arrangement for shielding the telescoping parts against accidental springing or bending; thus insuring the perfect operation of this vital part of the operating mechanism.

The invention consists in certain novel features of construction and arrangement of parts, as will be hereinafter described and claimed, reference being had to the accompanying drawings in which:—

Fig. 1 is a side elevation of my improved davit, with the protecting arrangement for the thrust screw omitted for clearness.

Fig. 2 is an elevation showing the outer end of Fig. 1.

Fig. 3 is a side view of the telescoping screw arrangement, on a somewhat enlarged scale, with parts of the protecting arrangement shown in section.

Fig. 4 is a sectional view of the telescoping tube with the protecting arrangement omitted.

Fig. 5 is a sectional view on an enlarged scale of the pivoted davit socket; and, Fig. 6 is a plan view of one of the circular plates forming a part of the protecting arrangement of the thrust screw.

The numeral 1 indicates the deck of a ship, and 2, a supporting plate mounted thereon. Rigidly secured to the outer end of the plate 2 is the elongated socket support 3, having the upturned ends 3$^a$ provided with alined bores 4. The standard 5 is mounted on the inner end of the plate 2, being preferably formed of a single piece of metal bent upon itself at the upper end to form two parallel sections securely held together by a bolt 6, with the inner one of said sections diverging below said bolt to form the brace portion 7 of the standard, the two ends of the standard being bent in opposite directions at their lower ends to form the spaced feet portions 5$^a$ and 7$^a$ respectively of the standard, whereby to strongly brace the standard against the strain imposed thereupon by the loaded davit.

The davit socket 8 is provided at its lower end with a transverse portion 9 connected by integral webs 10 with the body of the socket, and terminating at its ends in downwardly extending ears 11 spaced an ample distance from each other and adapted to be received between the ears 3$^a$ of the support 3, and having alined bores 12 to correspond with the alined bores 4 of said last named ears, whereby the socket 8 is rotatably mounted on the support 3 by means of the pin or bar 13 which passes through all of said alined bores.

The socket 8 is provided at its top with an annular outwardly extending flange 14 having one or more small bores 15 therein. A cap 16 having an integral collar 17 adapted to be rigidly secured to the davit, is mounted on top of the socket 8, with its downwardly extending annular lip 18 fitting around the outer peripheral edge of the flange 14 to prevent water and dirt from entering the socket, and to hold the davit against rocking laterally in the socket even though it be loosely mounted therein. The cap 16 has one or more bores 19 adapted to come into registration with the bores 15 of the socket, so that a pin 20 may be passed down through two of these registering bores to lock the cap 16 against rotation on the socket when desired.

A handle 21 is rigidly secured to the collar 17 of the cap 16 for purposes more specifically referred to hereafter.

Attention is now called to the thrust screw arrangement by which the socket 8 and the davit 22 carried thereby are rocked back and forth. Said arrangement consists of a tube 23 with a cap 24 screwed onto the outer end thereof, with a ball 25 received inside the cap between the bottom thereof and the inner end of the tube 23, the ball 25 being provided with a central threaded opening adapted to receive the threaded screw rod 26, the tube 23 and the head of the cap 24 having an opening 27 considerably larger than the screw rod 26; the screw rod having a head 28 shrunk on its outer end, said head being provided with a conical inner face 29 which cooperates with a correspondingly beveled bore in the head of the cap 24; said head 28 of the screw rod being connected through the universal joint 30 (see Fig. 1) with the operating crank 31 on the short shaft 32 suitably mounted in the upper end of the standard 5.

A small pin 33 secured in the ball 25 and extending out through the opening 34 in the under side of the cap 24, prevents the ball from rotating with the screw rod 26, the opening being large enough to permit ample clearance around the pin 33.

A small inverted cap or stopper 35 closes the outer end of the opening 27 of the tube 23 to exclude salt air and salt water.

The tube 23 is bifurcated at its inner end to form the pair of parallel ears 36 sufficiently spaced apart to receive between them the integral lug 37 at the upper end of the socket 8, said ears and lug being pivotally connected together.

From the foregoing it will be seen that we have a universal joint connection 30 outside the telescoping parts and another universal joint 25 inside the telescoping parts.

Fig. 3 illustrates a simple method of bracing the tube 23 against bending. Circular plates 38 and 39 having ample collars are shrunk onto said tube 23 so as to be very rigidly secured thereto. A third plate 40 is snugly received on the outer end of the cap 24 as shown, and is held in position thereon by the rods 41 which extend through all three of the plates and are provided on their ends with threaded nuts 42 for adjusting purposes. The rods 41 are provided with rigid stops 42$^a$ for engagement with the outer face of the plate 39; and the plate 40 and the portion of the rods extending therefrom to the stops 42$^a$ may be omitted whenever desired; or there may be one set of rods connecting the plate 39 with the plate 38, and another set connecting said plate 39 with the plate 40 whenever it is desired to have the protecting rods extend over the cap 24, in which case the plate 39 is provided with eight bores 43 as shown in Fig. 6, instead of only four as in the plates 38 and 40.

The operation of my device is as follow:—

The davit 22 is rotatably mounted in the socket 8 with the cap 16 rigidly secured to the davit by any ordinary or preferred means, as for instance, by the key 44 (see Fig. 1). The overhanging peripheral flange 18 of the cap 16 engages the outer periphery of the flange 14 at the upper end of the socket, snugly fitting the same, and thereby forms a bearing adapted to receive the heavy lateral strain imposed upon the davit when swinging out a heavy load, thus holding the davit against lateral play in the socket and preventing the grinding of the davit against the inner walls of the socket at the upper end thereof.

The davit is rocked in and out by means of the thrust screw arrangement which is operated by the crank 31.

Since the davit is rotatable in the socket 8, the thrust screw arrangement is relieved of all torsional strain such as would otherwise be imposed thereupon if the davit were rigidly mounted in the socket; and the jib of the davit may therefore be made to extend over farther than would otherwise be practicable, so as to engage the lifeboats farther in from their ends, since lifeboats when heavily loaded are much more liable to become sprung and distorted when supported near their ends than if supported farther in toward the centre of the boats.

When the davit is rocked inwardly past its vertical position (indicated by the dotted line $a$ in Fig. 1) it will have a tendency to automatically rotate inboard and to remain inboard; whereas, when it is rocked outwardly past said vertical line $a$, it will have a tendency to rotate outboard, and thus accelerate the outward movement of a boat. When the davit is moved out past the vertical line $a$ to a point where it just begins to move out automatically, the operator may take hold of the handle 21 and directly operate the davit thereby, thus providing auxiliary means for a very quick and direct manual movement of the davit to its inboard and outboard positions, only leaving the remainder of the operation to be performed by the operation of the thrust screw.

When desired, the davit may be locked against rotation in the socket by means of the pin 20 and the openings 15 and 19 as already described, in which case the davit is entirely operated by the thrust screw arrangement.

The downwardly extending ears 11 at the lower end of the socket are spaced wide apart to strongly brace the socket against the lateral strain imposed thereupon by the greater than ordinary inward extent of the jib of the davit, to prevent any twisting or torsional strain upon the thrust screw mechanism. However, in case such strain is imparted to said mechanism so that the tube 23 is bent thereby, or in case said tube should accidentally become permanently bent somewhat from other cause, the fact that the screw rod has an internal universal joint 25 and has lateral play in the tube 23, will prevent said screw rod from binding in said tube, so that despite the bend in the tube, the thrust screw arrangement will still work perfectly.

To further insure the perfect working of the thrust screw arrangement at all times, it is provided with the protecting arrangement shown in Fig. 3 which is composed of the circular plates 38, 39, and 40, and the rods 41, as already described.

By a proper adjustment of the nuts 42 on the ends of the rods 41, the protecting arrangement will also serve as a means of straightening the tube 23 when it has become bent or distorted, just as the proper adjustment of the tension on the spokes of a bicycle will true up the rim.

This protecting arrangement is quite useful, because dockworkers are often careless and liable to drop things on the thrust screw arrangement, and also to tie ropes to it, and in these and other ways bend it.

In this connection, attention is also called to the fact that the handle 21 of the device is so disposed that when the davit is in its normal inboard position, as indicated in Fig. 1, said handle extends directly over the tube 23 to prevent anything from falling thereupon.

Attention is also called to the fact that when the ship goes down by head or stern, the boats may be pitched forwardly or rearwardly, and thus rammed against the thrust screw arrangement. Hence the value of the protecting feature which I have provided.

If the rods 41 are made sufficiently strong, the threaded connection between the tube 23 and the cap 24 may be omitted and said rods depended upon entirely to hold the cap 24 in place on said tube 23.

The standard 5—7 of my device, being formed of a single piece of material, gives a very reliable support at the inner end of the device.

From the foregoing, it will be seen that I have produced a device of simple, strong, and durable construction, exceptionally well adapted to the requirements of a davit of this character, and one that may also be used with block and tackle whenever desired, in which latter case, the thrust screw arrangement is only used to impart to the davit such inward or outward inclination as will cause it to rotate automatically inboard or outboard as may be desired, leaving the boat to be further manipulated by the tackle.

Having now described my invention, what I claim as new and desire to protect by Letters Patent is:—

1. The combination with a vessel, of a socket mounted thereon at its lower end to rock in a vertical plane; a davit rotatably mounted in the socket; a stationary member on the vessel; thrust screw mechanism connecting the upper portion of the socket with the stationary member and adapted to rock the socket past the vertical to impart to the davit supported therein a tendency to rotate by gravity in the direction of its inclination and also to raise and lower the davit independently of the rotatable tendency imparted thereto; means on the davit at the upper end of the socket for excluding water and dirt from the socket and for holding the davit out of engagement with the inner upper walls of the socket as it rotates therein.

2. The combination with a vessel, of a socket mounted thereon at its lower end to rock in a vertical plane; a davit rotatably mounted in the socket; a stationary member on the vessel; thrust screw mechanism connecting the upper portion of the socket with the stationary member and adapted to rock the socket past the vertical to impart to the davit supported therein a tendency to rotate by gravity in the direction of its inclination; and a handle connected with the davit for manually augmenting its tendency to rotate by gravity, said handle being arranged to normally extend out over said thrust screw mechanism to protect the same.

3. The combination with a socket pivoted at its lower end to rock back and forth in a vertical plane, of a stationary member; extensible telescoping members normally in alinement with each other connecting the stationary member and the socket to rock the latter back and forth, the diameter of the inner telescoping member being sufficiently less than the inner diameter of the outer telescoping member to afford play of the one within the other, said members being connected together by a universal joint connection, through which the inner telescoping member has longitudinal movement; whereby to permit the telescoping members to be moved out of alinement with each other without binding.

4. The combination with a davit pivoted at its lower end to rock back and forth in a vertical plane; of a stationary member; extensible telescoping members connecting the davit at a point above its pivoted end with the stationary member to rock the davit on its pivot; and an internal universal joint connecting said telescoping members together to compensate for bending in the outer telescoping member.

5. In a device of the character described, thrust screw mechanism comprising an outer tube with a cap on one end thereof; a ball joint interposed between the cap and the end of the outer tube; said ball having a central threaded opening; a screw rod extending inwardly through the head of the cap and through said threaded opening, said rod being spaced from the inner walls of said outer tube; means for engaging and rotating the screw rod; and means for holding the ball joint against rotation with said bar.

6. The combination with a vessel of a socket mounted thereon at its lower end to rock in a vertical plane; a stationary member on the vessel; a tubular member connected to the socket between its pivot point and its upper end; a threaded connecting member inside said tubular member and movable relatively thereto but held against longitudinal movement therein; a thrust bar rotatably mounted in said fixed member and having threaded engagement with said connecting member to move the same together with the tubular member back and forth longitudinally, whereby to rock the socket back and forth.

7. In devices of the character described, means for rocking the davit back and forth, comprising extensible telescoping members; plates secured to the outer one of said members; and spaced adjusting bars carried by said plates for straightening bends in said outer member.

8. In a device of the character described, means for rocking the davit back and forth, comprising extensible telescoping members connected with the davit at one end; and at its other end having a fixed member secured to the ship; a universal joint connection outside the telescoping parts for connection with said stationary part; and another universal joint connection inside the telescoping parts for connecting said parts to each other.

9. In a device of the character described, means for rocking the davit back and forth, comprising extensible telescoping members and a member fixed to the ship, said telescoping members being arranged for connection at one end with the davit and at the other end with the fixed member, the inner telescoping member being externally threaded; a round member carried by the outer telescoping member and having an internally threaded bore for the reception of the inner telescoping member, said round member forming the connecting link between the two telescoping members; and means for holding said round member against rotation with the inner telescoping member.

In testimony whereof I affix my signature.

ANE PIETER SCHAT.